US011361476B2

(12) United States Patent
Young et al.

(10) Patent No.: US 11,361,476 B2
(45) Date of Patent: Jun. 14, 2022

(54) EFFICIENT COLOR MAPPING SYSTEMS AND METHODS

(71) Applicant: Apple Inc., Cupertino, CA (US)

(72) Inventors: Vincent Z. Young, San Francisco, CA (US); Can Jin, San Jose, CA (US); Mahesh B. Chappalli, San Jose, CA (US); Peter F. Holland, Los Gatos, CA (US); Nicolas Pierre Marie Frederic Bonnier, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/020,705

(22) Filed: Sep. 14, 2020

(65) Prior Publication Data

US 2022/0084260 A1   Mar. 17, 2022

(51) Int. Cl.
*G06T 11/00*   (2006.01)
*G09G 3/20*    (2006.01)
*G06T 1/20*    (2006.01)

(52) U.S. Cl.
CPC .............. *G06T 11/001* (2013.01); *G06T 1/20* (2013.01); *G09G 3/20* (2013.01); *G09G 2340/06* (2013.01)

(58) Field of Classification Search
CPC ................................ G06T 1/20; G09G 2340/06
See application file for complete search history.

(56) References Cited

U.S. PATENT DOCUMENTS

| 7,940,982 B1* | 5/2011 | Shaick ............ H04N 1/46 382/162 |
| 9,467,704 B2 | 10/2016 | Ten |
| 10,027,996 B2 | 7/2018 | Oh et al. |
| 2004/0051888 A1 | 3/2004 | Zolliker |
| 2013/0034159 A1* | 2/2013 | Siekmann ........ H04N 19/44 375/240.12 |
| 2017/0301310 A1* | 10/2017 | Bonnier ............ G09G 5/06 |
| 2019/0306517 A1* | 10/2019 | Strom .............. H04N 19/85 |
| 2020/0035198 A1* | 1/2020 | Kouno ............. G09G 5/04 |
| 2021/0074239 A1* | 3/2021 | Tao ................ G06T 1/20 |

* cited by examiner

*Primary Examiner* — Samantha (Yuehan) Wang
(74) *Attorney, Agent, or Firm* — Fletcher Yoder, P.C.

(57) ABSTRACT

An electronic device may include a display panel with pixels that present an image based on image data and an application processor that generates the image data. The electronic device may include a display pipeline coupled to the electronic display and the application processor. The display pipeline may receive first image data from the application processor corresponding to a first color space used by the application processor. The display pipeline may apply a color mapping relationship to the first image data to generate second image data. The color mapping relationship may define a transform to apply to the first image data to generate the second image data corresponding to a second color space used by the electronic display. The display pipeline may transmit the second image data to a display driver that operates the electronic display to emit light according to the second image data.

20 Claims, 8 Drawing Sheets

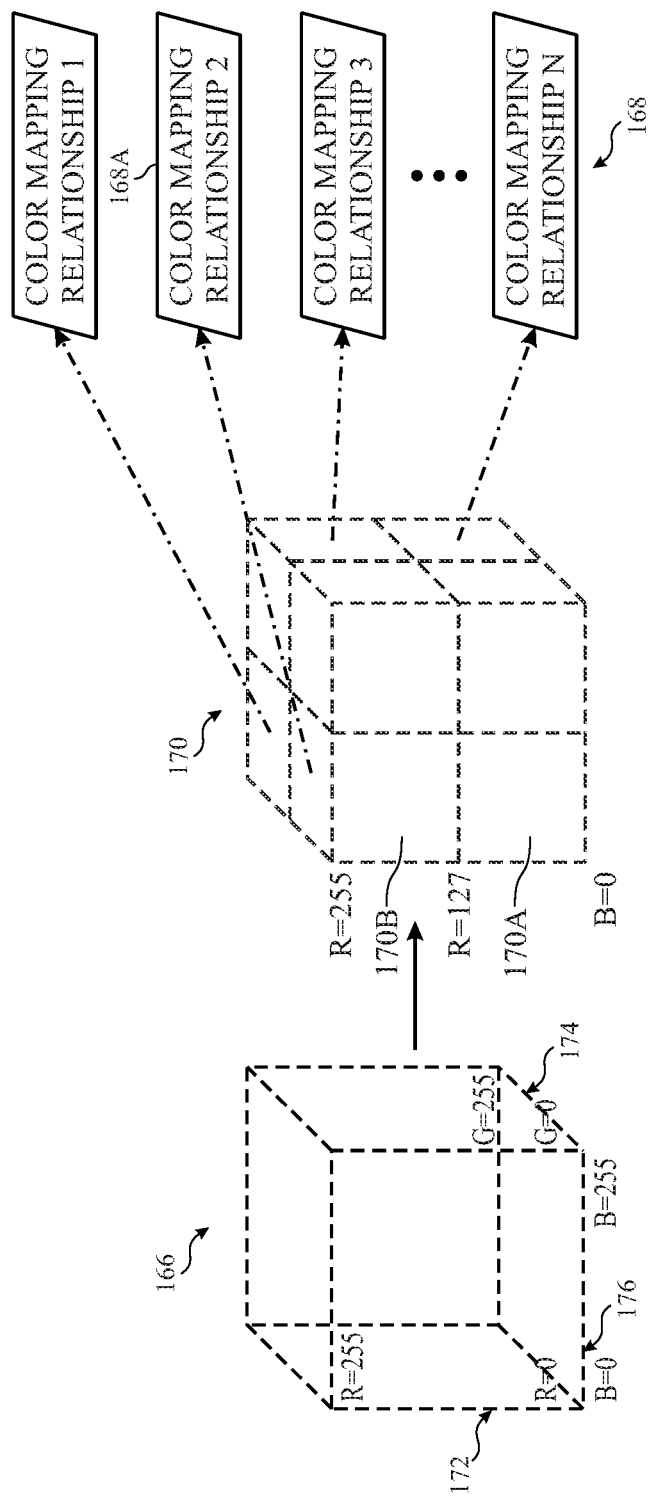

EFFICIENT COLOR MAPPING SYSTEMS AND METHODS

BACKGROUND

The present disclosure relates generally to image processing and, more particularly, to efficiently color mapping image data for display on an electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present text, still images, and/or video by displaying one or more image frames in sequence. For example, such electronic devices may include computers, mobile phones, portable media devices, tablets, televisions, virtual-reality headsets, and vehicle dashboards, among many others. In any case, to display an image, an electronic display may control light emission (e.g., luminance) of its display pixels based at least in part on corresponding image data.

In some instances, the electronic device may process image data used when presenting the one or more images. When processing the image data, certain complex color transforms may be used to improve color image quality, such as when changes in color gamut occur between generation of the image data (e.g., at an image source) and presentation of the image data (e.g., at a display). In some cases, three-dimensional (3D) color lookup tables (3D CLUTs) may be used in an image-processing integrated circuit device of the electronic device to perform complex color transforms. However, a 3D CLUT may not be able to make fine adjustments to specific regions. Moreover, a 3D CLUT may take up a substantial amount of die space and/or memory of an integrated circuit device. This may be of particularly concern for wearable and/or portable electronic devices with batteries that store a finite amount of electrical energy and/or have a finite amount of die space.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic device may include a display pipeline that processes image data to improve the perceived image quality of image frames presented using the image data. The image processing circuitry of the electronic device may include a color gamut mapping block (e.g., gamut mapping block). The color gamut mapping block may use mapping relationships (e.g., color mapping relationships) to transform image data from an original color space to another color space. In this way, the color gamut mapping block may be more efficient than other ways to perform the transformation, such as a three-dimensional color look-up table (3D CLUT). For example, a 3D CLUT may define, for each color value, how the color in a first color space is to be represented equivalently (e.g., perceivably indistinct) in a second color space.

As may be appreciated, the 3D CLUT may be stored in relatively large amounts of memory. By contrast, the color mapping relationships of this disclosure may involve a comparably smaller amount of memory.

Indeed, the color mapping relationships of this disclosure may define a transform between color spaces using an input/output relationship definition (as opposed to storing multiple individual data points directly indicative of the transform). For example, the color mapping relationships of this disclosure may define corrections applied to image data A in a first color space to obtain image data B in a second color space. Storing a color mapping relationship may use fewer memory resources since the color mapping relationship may be defined by a relatively smaller number of variables to define transformation matrices, coefficients, or the like of the color mapping relationship. Storing this relatively small number of variables uses less memory in relation to storing an entire look-up table for each color value conversion.

When applying the color mapping relationship, the color gamut mapping block may retrieve the variables from memory and apply the variables to a color mapping relationship function format to derive the color mapping relationship for the color space. For example, if the color mapping relationship were to be an affine relationship between the first color space data (x) and the second color space (y), the color gamut mapping block may access a color mapping relationship function like y=Ax+b and access from memory the variables for transformation matrix (A) and offsets (b). Then, to obtain the image data in the second color space, the color gamut mapping block may apply the first color space data (x) to the color mapping relationship function (now particularly defined by variables retrieved from memory) to obtain the second color space data (y). Indeed, the color mapping relationship may generate an output after applying the variables to the input without applying an interpolation between data points stored in a look-up table to derive the value.

Sometimes color space transforms use a hybrid color space as intermediate color spaces, such that the color relationship of input and output image data is defined in such intermediate color spaces to enable the transform between the one or more color spaces. For example, the color gamut mapping block may receive image data according to a red-green-blue (RGB) color space (e.g., first color space). The color gamut mapping block may transform the image data to a luminance—first chroma component—second chroma component (YCbCr) color space (e.g., hybrid color space, third color space) before transforming the image data to the second color space. The intermediate color spaces may be relatively perceptually uniform, and their axes are defined with perceptual meaningful quantities such as luminance and chroma, to improve color transformation quality. Indeed, in some cases it may be desirable to apply transforms (e.g., affine relationship) while image data is formatted according to the intermediate color space, since doing so may improve perceived uniformity of resulting images generated using transformed image data. Furthermore, the transformation may involve using regionally defined color mapping relationships with or without use of the hybrid color space.

The color gamut in the color space of an output display device may be divided into sub-spaces, and each sub-space may correspond to different color relationships relative to the color space of the image source. Thus, each sub-space may each correspond to different transforms used to convert the color space of the image source to the color space of the display device. Since these conversions may be performed with or without use of the hybrid color space (e.g., intermediate color space), the transform may consider the hybrid color space or may not consider the hybrid color space. In either case, however, one or more color spaces are divided into sub-spaces, and different color relationships may be defined for each sub-spaces.

For example, the color gamut mapping block may subdivide the input color gamut into regions (e.g., sub-spaces). As an example, a respective input color value from the set of input image data may correspond (e.g., fall into) to one of the sub-spaces, and thus may have the color transformation relationship defined in that sub-space applied when converting the input color value to an output color value compatible with the color space of the display device. Each sub-space may define different transforms that, collectively, may produce an overall transform that is relatively complex over the entire color space. Yet each sub-space may define a comparatively simple transform, such as affine transformation. By carefully defining each of the sub-spaces and sub-space transforms, a complex transform, such as a nonlinear transform, may be achieved when considering the whole input color gamut combining all sub-spaces. Furthermore, even a color gamut mapping block applying regionally-defined color mapping relationships may use less die space or memory than a 3D CLUT.

The color transform relationships in each sub-space may be defined such that the output color gamut is still continuous across sub-spaces. For example, the color value that resides on the boundary of two adjacent sub-spaces A and B, may be adjusted by either color relationship corresponding to sub-space A or sub-space B, and result the same output color value. A default rule may be defined to handle these boundary cases. For example, each time the boundary value is encountered, the transformation applied corresponds to sub-space A as opposed to sub-space B, or vice versa.

The color gamut mapping block may involve an efficient sub-space search process. An efficient sub-space search algorithm may identify which sub-space input color data resides in to apply the transform relationship associated with the sub-space. One search method may be a binary tree space search method, where the sub-spaces are arranged in a binary tree based on the spatial relationships between the sub-spaces inside the input color space. The spatial relationships may organize values different between each sub-space such that sub-spaces corresponding to respective color values of the input image data may be identified by iterative searching of the binary tree. Indeed, in the binary tree search space method, image data may be matched over several iterations of searching through the binary tree, such that when a higher level match is found, further portions of the image data are compared to the binary tree to identify which sub-space particular image data corresponds to without having to search each sub-space condition in its respective entirety.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 is a diagrammatic representation of another example of operations performed by the gamut mapping block of FIG. 7, in accordance with an embodiment.

DETAILED DESCRIPTION OF SPECIFIC EMBODIMENTS

Figure 1:
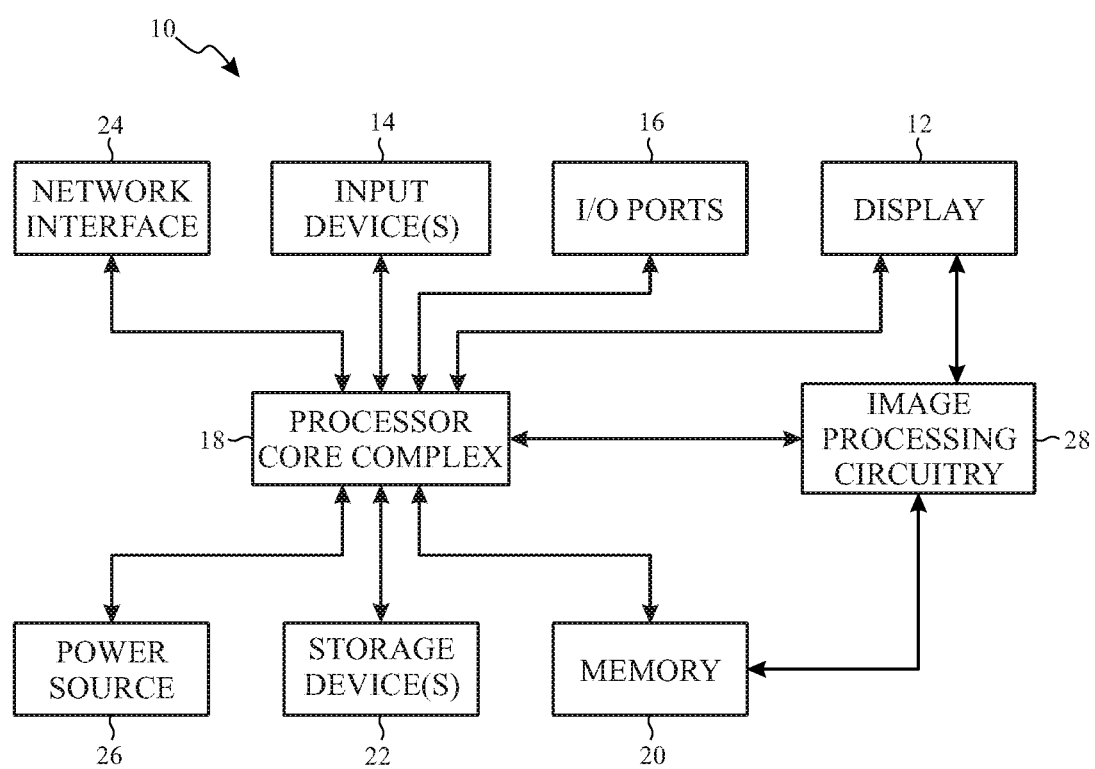
FIG. 1 is a block diagram of an electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

An electronic device may include components that, in operation, consume electrical power. For example, electronic devices may include circuitry (e.g., image source, application processor) that render image frames by generating corresponding image data. Electronic devices may also include a display pipeline that processes the image data before the image data is used to display the image frame on an electronic display. The processing of the image data may improve the perceived image quality of the image frame.

Based at least in part on received image data, the electronic display may control light emission (e.g., luminance) of its display pixels to present a corresponding image frame. For example, in a liquid crystal display (LCD), electrical energy may be stored in the pixel electrode of a display pixel to produce an electric field between the pixel electrode and a common electrode, which controls orientation of liquid crystals and, thus, light emission from the display pixel. Additionally, in an organic light-emitting diode (OLED) display, electrical energy may be stored in a storage capacitor of a display pixel to control electrical power (e.g., current) supplied to a self-emissive component (e.g., OLED) and, thus, light emission from the display pixel. However, electronic devices, such as wearable or portable electronic devices, often store a finite amount of electrical energy.

Accordingly, the present disclosure provides techniques for transforming color spaces using a color gamut mapping block. The gamut mapping block may enable the display pipeline to make fine adjustments to specific colors of image data and/or reducing an amount of physical space and/or logical space used to provide the image processing circuitry. Furthermore, the gamut mapping block may provide some advantages over a 3D CLUT when used to perform some processing of display pipeline; for example, the gamut mapping block may use color mapping relationships that are able to be stored using relatively less space in memory.

Indeed, the color gamut mapping block may receive image data in a first color space for transformation to image data of a second color space. The color gamut mapping block may use a hybrid color space when performing the transform. When the data is in the hybrid color space, the color gamut mapping block may transform the color based on predefined color transformation relationships. The second color space, where the relationship is defined, may be divided into sub-spaces, and different color relationships may be defined for each sub-space. Since each sub-space may be associated with a different transform (e.g., respectively defined transform that may include the same or different transforms), each sub-space may define a relatively simple transform, such as affine transformation, and by carefully define sub-spaces and sub-space transforms, a complex transform, such as a nonlinear transform, may be achieved considering the whole input color gamut combining all sub-spaces.

The color gamut mapping block may, in some cases, divide the color space itself into regions, and perform the color space transformations over the color space regions. The gamut mapping block may generate a color mapping relationship for the first color space to convert image data from the first color space to the second color space. However, the color mapping relationship may better transform between color spaces for smaller regions of the color space as opposed to a mapping relationship of the color spaces as a whole. As one may appreciate, it is generally more efficient to generate a linear and/or non-linear relationship for a smaller set of data and/or for data with fewer outliers (and/or less variance) than for a dataset that is larger and/or one with more outliers. Thus, the color mapping relationship may be more efficiently generated since less computing resources may be used when the gamut mapping block generates the color mapping relationship for each region separately (and/ or separately and in parallel, and/or separately and having a same start time). Region-based mapping may also improve mapping operations since equation roots are sometimes determined when generating the color mapping relationship (e.g., slopes and/or characteristics) may be faster to converge, and thus less resource-intensive, when determined for each of the various regions relative to performing the same color mapping relationship determination for the entire cube (e.g., entire color space).

It is noted that at the output from the color gamut mapping block, a certain amount of truncation of data may occur to help fit the output to a future input. This may involve a transformation of a hexadecimal value from a first length to a second length. Any suitable amount of data may be added to the image data before processing by the color gamut mapping block and/or any suitable amount of data may be truncated from the image data after processing from the color gamut mapping block.

To help illustrate, an electronic device 10 including an electronic display 12 (e.g., display device) is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more of self-emissive pixels. The electronic display 12 may include any suitable circuitry to drive the self-emissive pixels, including for example row driver and/or column drivers (e.g., display drivers). Each of the self-emissive pixel 82 may include any suitable light emitting element, such as a LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. The image processing circuitry 28 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

As depicted, the processor core complex 18 is also operably coupled with the network interface 24. The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network.

The processor core complex 18 is operably coupled to the power source 26. The power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

The processor core complex 18 is operably coupled with the one or more I/O ports 16. The I/O ports 16 may enable the electronic device 10 to interface with other electronic devices. For example, when a portable storage device is connected, the I/O port 16 may enable the processor core complex 18 to communicate data with the portable storage device.

The electronic device 10 is also operably coupled with the one or more input devices 14. The input device 14 may enable user interaction with the electronic device 10, for example, by receiving user inputs via a button, a keyboard, a mouse, a trackpad, and/or the like. The input device 14 may include touch-sensing components in the electronic display 12. The touch sensing components may receive user inputs by detecting occurrence and/or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by displaying frames based at least in part on corresponding image data. As depicted, the electronic display 12 is operably coupled to the processor core complex 18 and the image processing circuitry 28. In this manner, the electronic display 12 may display frames based at least in part on image data generated by the processor core complex 18, the image processing circuitry 28. Additionally or alternatively, the electronic display 12 may display frames based at least in part on image data received via the network interface 24, an input device, and/or an I/O port 16.

Figure 2:
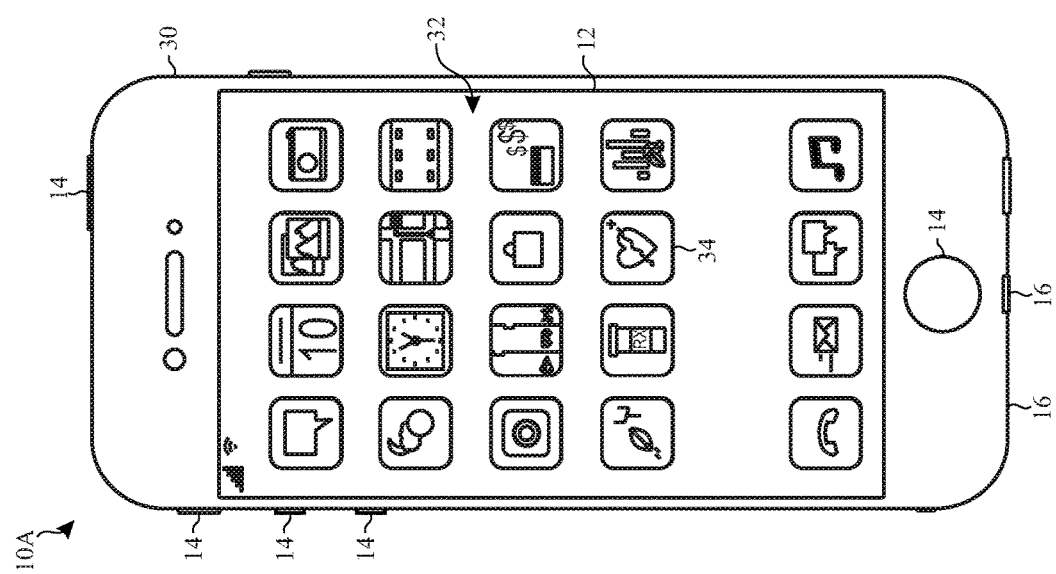
FIG. 2 is an example of the electronic device of FIG. 1, in accordance with an embodiment.

As described above, the electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, and/or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 may be accessed through openings in the enclosure 30 and may include, for example, an audio jack to connect to external devices.

Figure 3:
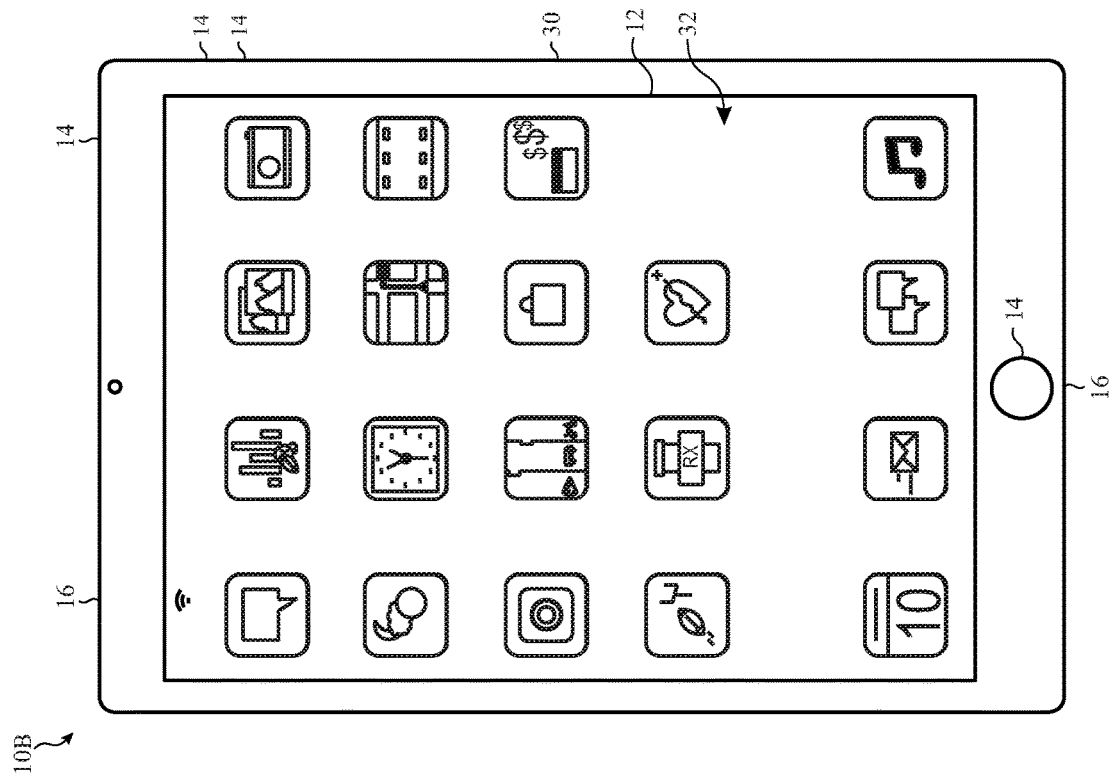
FIG. 3 is another example of the electronic device of FIG. 1, in accordance with an embodiment.
Figure 4:
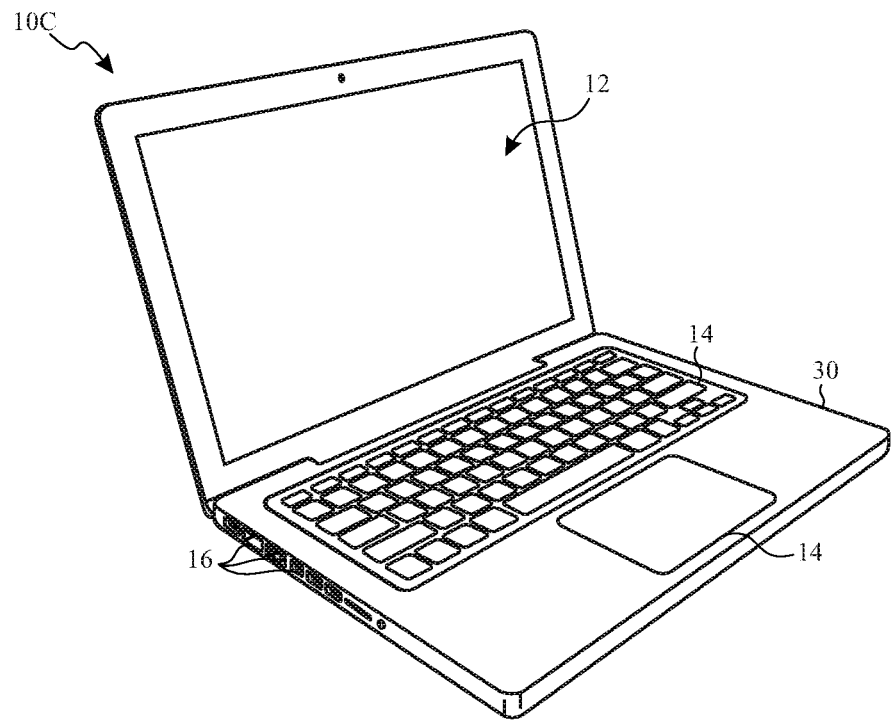
FIG. 4 is another example of the electronic device of FIG. 1, in accordance with an embodiment.
Figure 5:
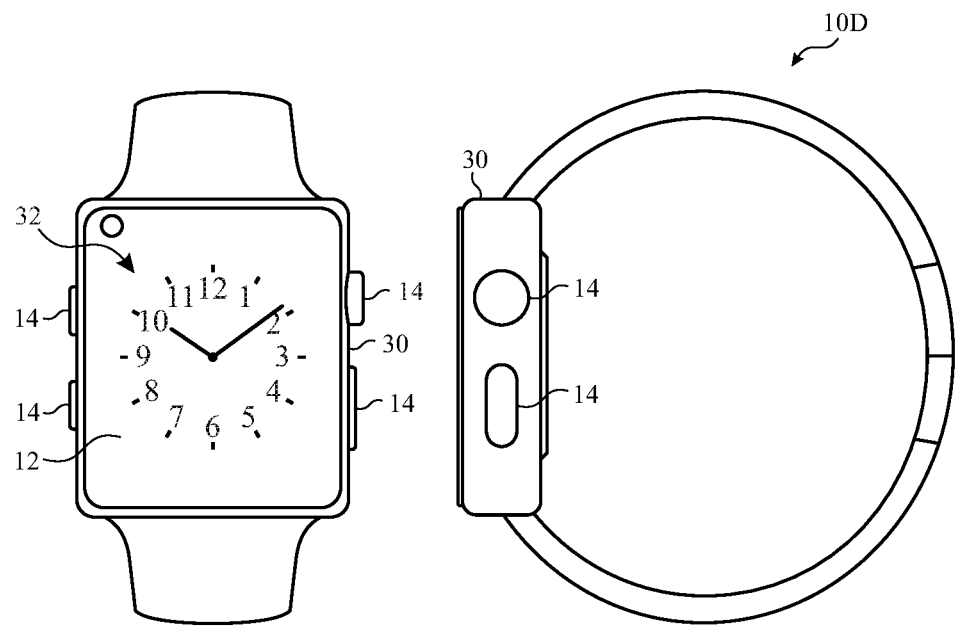
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MAC-BOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
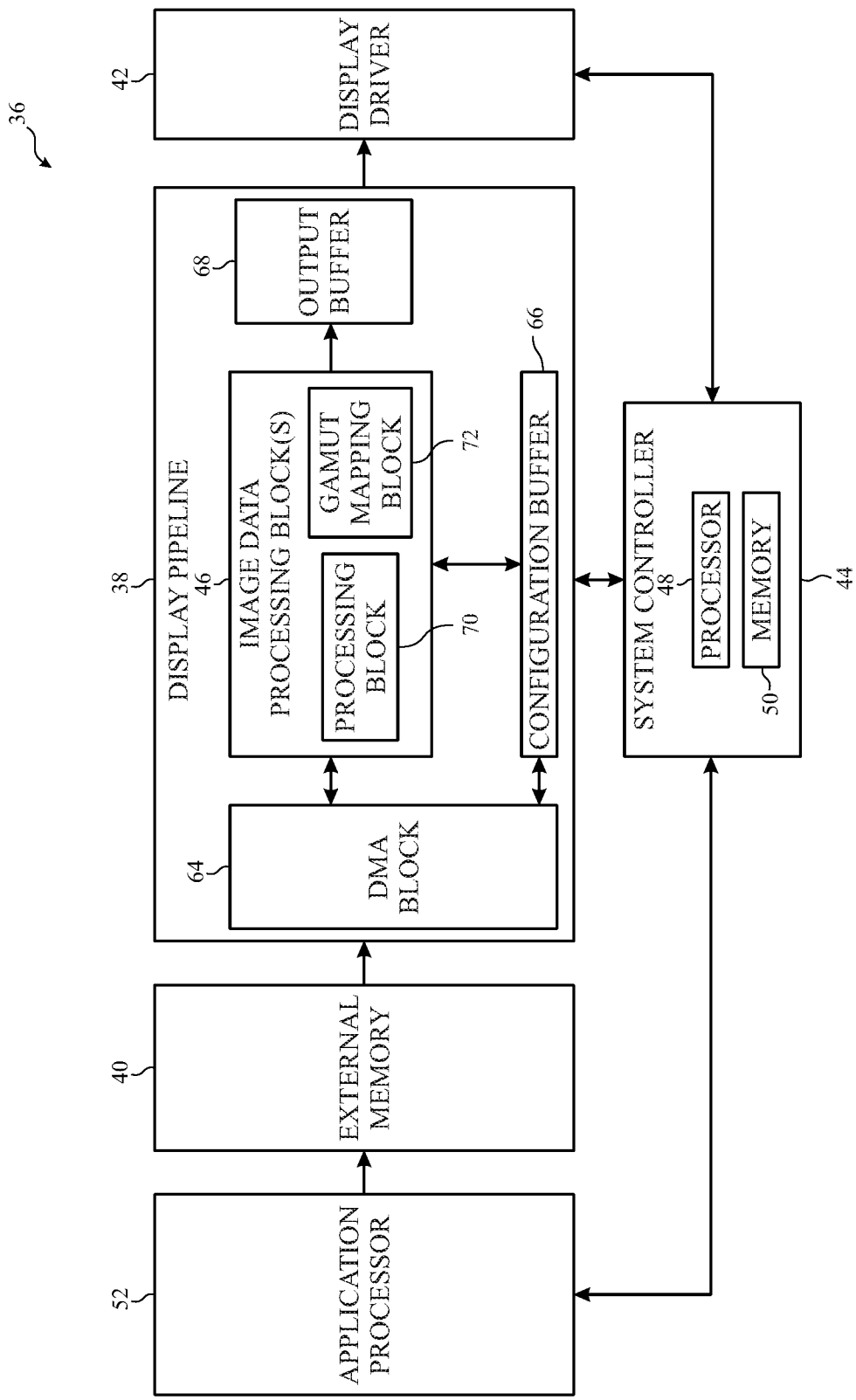
FIG. 6 is a block diagram of a portion of the electronic device of FIG. 1 including an application processor and a display pipeline, in accordance with an embodiment.

Operating an electronic device 10 to communicate information by displaying images on its electronic display 12 generally consumes electrical power. The electronic device 10 often stores a finite amount of electrical energy. An image processing system 36 that includes a display pipeline 38, which may be implemented in an electronic device 10, is shown in FIG. 6. As depicted, the image processing system 36 also includes an external memory 40 (e.g., local memory 20), a display driver 42, and a system controller 44, which may be implemented in an electronic display 12. The system controller 44 may control operations of the display pipeline 38, the external memory 40, the display driver 42, and/or other portions of the electronic device 10. It is noted that the display pipeline 38 may include control circuitry, such as control circuitry similar to the system controller 44 but particular to management of communication between components of the display pipeline 38 (e.g., between image processing and/or configuration blocks).

The system controller 44 may include a controller processor 48 and controller memory 50. The controller processor 48 may execute instructions stored in the controller memory 50. The controller processor 48 may be included in the processor core complex 18, the image processing circuitry 28, a timing controller in the electronic display 12, a separate processing module, or any combination thereof. The controller memory 50 may be included in local memory 20, the main memory storage device 22, external memory 40, internal memory of a display pipeline 38, a separate tangible, non-transitory, computer readable medium, or any combination thereof. Although depicted as a system controller 44, in some cases, several separate system controllers 44 may be implemented to control operation of the electronic device.

The display pipeline 38 may operate to process image data to improve perceived image quality of a resulting image presented on the electronic display 12. An application processor 52 generates and stores the image data in the external memory 40 for access by the display pipeline 38. The display pipeline 38 may be implemented via circuitry, for example, packaged as a system-on-chip (SoC). The display pipeline 38 may be included in the processor core complex 18, the image processing circuitry 28, a timing controller (TCON) in the electronic display 12, other one or more processing units, other processing circuitry, or any combination thereof.

The display pipeline 38 may include a direct memory access (DMA) block 64, a configuration buffer 66, an output buffer 68, and one or more image data processing blocks 46 (e.g., a processing block 70 and a gamut mapping block 72). The various blocks of the display pipeline 38 may be implemented using circuitry and/or programmable instructions executed by a processor. The display pipeline 38 may retrieve image data from the external memory 40 and may process the image data before transmission to the display driver 42. The processing block 70 and the gamut mapping block 72 may perform process the retrieved image data to try to make the retrieved image data more suitable for presentation. The image data may be processed to compensation or adjust the perceivable appearance of image based on current operating and/or environmental conditions, such as to adjust the image data depending on the color or brightness of ambient light.

Indeed, color values of images to be represented by the image data may be mapped to image reproduction configurations of an output device (e.g., the electronic display 12). This may be especially true for an image reproduction system that generates image data for transmission to the output device. For example, a photographic printer, a photo laboratory, a monitor, a printer, a color laser printer, an inkjet printer, a second electronic device, an image source may each be considered image reproduction systems. A color space of the device is referred to as color gamut of the device. The color gamut of the image capturing device (e.g., image source) may include each color values able to be captured and output by the image capturing device. The image data output by the image capturing device may not totally reflect the color gamut of the output device, and thus the gamut mapping block 72 may perform a transform to translate a color gamut (e.g., color space) of the image capturing device (or image source) into a color gamut (e.g., color space) of the output device (e.g., electronic display 12). Furthermore, the processing block 70 may perform additional operations to adjust the image data received by the display pipeline 38 to be suitable for presentation. For example, the processing block 70 may adjust a brightness level of the image data based on a brightness level of ambient light and/or may adjust a white point of the image data based on a white point of a color of the ambient light sensed by a sensor communicating with the application processor 52.

Figure 7:
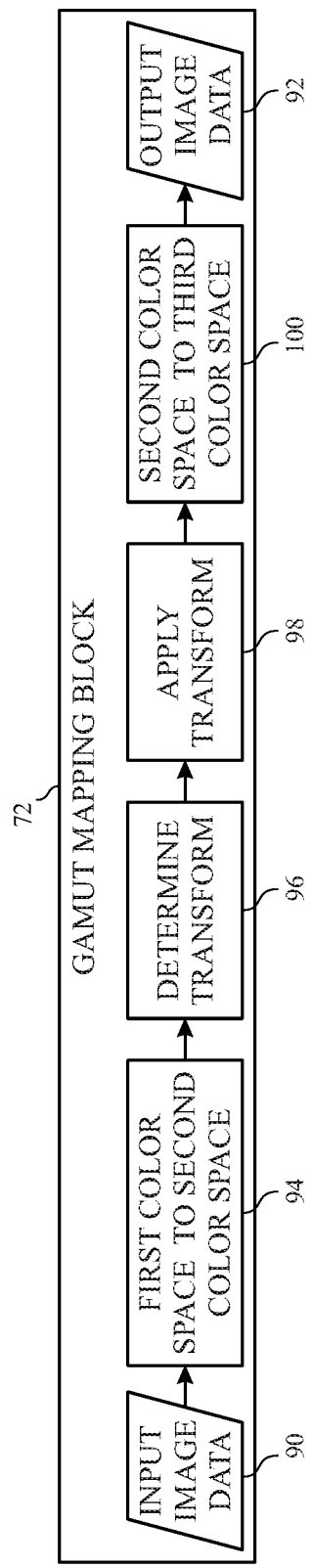
FIG. 7 is a block diagram of operations performed on input image data by a gamut mapping block of the display pipeline of FIG. 6, in accordance with an embodiment.

FIG. 7 is a block diagram of operations performed by the gamut mapping block 72 on input image data 90. The gamut mapping block 72 may generate output image data 92 corrected of at least some color space-related differences between a source (e.g., image source) of the input image data 90 and the electronic display 12.

Indeed, a color space may generally refer to a specific organization of colors in combination with a configuration and/or profile of an electronic display 12 (or an electronic device 10). A color space may facilitate repeatable conversion of image data generated by a first device to emitted light perceivable from a second device. Correction of the color space-related differences may improve operation of the electronic device 10 by improving a perceivable quality of image presented on the electronic display 12.

Improving the perceivable quality of image displayed may involve reducing amounts of perceivable visual artifacts. Visual artifacts may be generated when a different color space is used to present image data than a color space used by an image source to generate the image data. For example, when an image source or image reproduction device generates the image data according to a first color space different from a second color space of the electronic display 12, perceivable visual artifacts may be presented with the image frame and/or the image frame may be misrepresented in presentation (e.g., wrong color, wrong brightness level, distortion in images presented). The misrepresentation may be present when a color gamut is converted to another smaller color gamut and the out-of-gamut values are clipped. Gamut color mapping may be performed to remedy the color space differences and to improve presentation of images, such as by improving consistency between image data generation and image data presentation and/or by reducing perceivable visual artifacts. When color space differences are considered, color gamut mapping may be performed such that out-of-gamut values are considered and/or included as part of output data post-conversion, as opposed to being clipped (e.g., discarded, unconsidered).

Indeed, using the systems and methods described herein for color gamut mapping, quality of images presented to operators with abnormal or atypical color vision (e.g., color blindness, color vision deficiencies (CVD)) may improve in perceivable quality (e.g., become more uniform). Improving the perceived quality of image displayed for people with abnormal color vision may involve transforming an input color gamut to an output color gamut using nonlinear distortion of colors, such as hue shift and luminance adjustment, applied to a subset of color regions that are to be adjusted to help people with abnormal color vision to read color information on displays. By reducing a scope of the adjustment to the subset of color regions to be adjusted, relatively high quality color images may be generated by adjusting the portions to be adjusted of the image data and by maintaining color gradients, natural colors, and color space regions where the portions of image data may be left unchanged. Selectively applying transforms as suggested herein may improve image quality when compared to image data generated by applying a global color transformation on a whole color space without applying the transformations via sub-spaces.

The display pipeline 38 may include a gamut mapping block 72 to perform gamut color mapping operations, such as the gamut color mapping operations that involve the use of sub-spaces. The gamut mapping block 72 may transform data generated according to a color space of a first device (e.g., a first color space) to a color space of a second device (e.g., a third color space). The gamut mapping block 72 may use a hybrid color space (e.g., second color space) or may operate in a bypass mode to bypass use of the hybrid color space. A transform that uses the hybrid color space is exemplified in FIG. 7, where the transform is represented as a series of color space transforms. For example, this may be represented as a first conversion from the first color space to the second color space (e.g., hybrid color space), and then from the second color space to the third color space. In this way, when a first device presents a first image frame having a first perceived appearance when viewed by an operator, the gamut mapping block 72 may cause a second device to present the same first image frame with the same first perceived appearance (as opposed to a different, second perceived appearance) when viewed by a same or different operator even when the second device has a different color space from the first device.

Sometimes performing a color space conversion on the input image data 90 to generate the output image data 92 involves converting the input image data 90 from an original color space to a hybrid color space (e.g., intermediate color space). The hybrid color space may be relatively perceptually uniform, and the axes of the hybrid color space may be defined with quantities such as luminance and chroma that are visible to a user (e.g., perceivable, perceptually meaningful), to improve color transformation quality. Indeed, in some cases it may be desirable to apply transforms (e.g., the affine relationship) while image data is formatted according to the intermediate color space since doing so may improve the perceived uniformity of resulting images generated using transformed image data.

For example, the gamut mapping block 72 may receive the input image data 90 in an original color space (e.g., a red-green-blue (RGB) color space, a first color space) and may, at block 94, convert the input image data 90 to a hybrid color space (e.g., a second color space), which is also referred to herein as a carrier color space. When using the hybrid color space, the color gamut mapping block 72 may transform the image data to a luminance—first chroma component—second chroma component (YCbCr) color space (e.g., hybrid color space, third color space) before transforming the image data to the second color space, where a third-component (Cg) may not be included in the YCbCr representation (e.g., Cg may be derivable from YCbCr data points without having to be directly computed). When the input image data 90 is in the YCbCr color space, the gamut mapping block 72 may, at block 96, determine a transform (e.g., an adjustment) to be made to the input image data 90. Additionally or alternatively, the gamut mapping block 72 may sub-divide the input image data 90 into regions (e.g., regions based on color value of the image data). At block 98, the gamut mapping block 72 may apply the transform to the input image data 90 on a per-region basis, based on the sub-space of the output color space to which the input image data 90 corresponds. Respective transforms may be applied separately to regions of the input image data 90 having the same color value, or these transforms may be performed at the same time and the resulting values propagated as appropriate through the output image datasets resulting from the transform (e.g., yielding faster computations since fewer discrete computations may be performed). The adjusted input image data 90 may, at block 100, be transformed to an output color space (e.g., RGB) from the hybrid color space (e.g., YCbCr), and transmitted from the gamut mapping block 72 for additional processing by the processing block 70 and/or for transmission to the output buffer 68.

The color transform relationships in each sub-space may be defined such that the output color gamut is continuous across sub-spaces. For example, the color value that resides on the boundary of two adjacent sub-spaces A and B may be validly adjusted by either color relationship corresponding to sub-space A or sub-space B, and may result in the same output color value. A default rule may be defined to handle these boundary cases. For example, each time the boundary value is encountered, the transformation applied may correspond to sub-space A as opposed to sub-space B, or vice versa.

The color gamut mapping block 72 may involve, such as at block 96 with determining the transform, a sub-space search. A sub-space search algorithm may identify which sub-space the input color data resides in to apply the transform relationship associated with that sub-space. One efficient search method may include a binary tree space search method, where the sub-spaces are arranged in a binary tree based on the sub-spaces' spatial relationships inside the input color space, so that the input data's sub-space may be searched iteratively by searching the binary tree. In this way, for a target value of image data (e.g., image data for a pixel, image data for a region of pixels), a portion of the target value of image data may be compared with a portion of a data defining the sub-space. This may be used to determine, after one or more iterations, in which sub-space to classify the image data. This may occur iteratively as additional comparisons may be performed when a match of smaller data occurs (e.g., to work through the tree branches as matches are encountered).

When converting the input image data 90 from the RGB color space into the YCbCr color space, at block 94, the three component values for the YCbCr space may be created from the original RGB (red, green and blue) color space image source. Indeed, image data may include various values representative of signals used to drive components of the electronic display 12 to render image frames (to present images on the electronic display 12). The signals may be analog signals or digital signals used to drive light-emitting devices of the electronic display 12 to present a respective image frame. The presented image frame may be updated in response to components of the electronic display 12 receiving next image data for a subsequent image frame.

The input image data 90 may include data interpretable by the display driver 42 to drive the light-emitting devices of the electronic display 12 to present the image frame in a color space. The color space of the electronic display 12 may be such that each perceivable color rendered on the electronic display 12 is the result of a combined light emission from multiple light-emitting devices. For example, the electronic display 12 may use a red-green-blue (RGB) color space, where a pixel may include a red component (R) subpixel, a blue component (B) subpixel, and a green component (G) subpixel. In one pixel, separate light emission from the red component (R) subpixel, the blue component (B) subpixel, and the green component (G) subpixel may collectively cause the pixel to appear to emit light of a particular color in a particular color space based on respective R, B, and G values. Different displays 12 may have different color spaces due to their different light-emitting components.

When converting the input image data 90 from a first color space to a second color space, certain image data transforms may be performed. In the case of the conversion from the RGB color space to the YCbCr color space, for example, weighted values of the R value, the G value, and the B value may be added together in different combinations to generate the values used to form YCbCr color space image data. Although the processing of the gamut mapping block 72 is described as performed in the YCbCr color space, it should be understood that in some cases the gamut mapping block 72 processes the images in the RGB color space (e.g., without a conversion), in a YCbCg (or YCrCg) color space, or the like. Other color spaces may also benefit from the processing techniques described herein.

Figure 8:
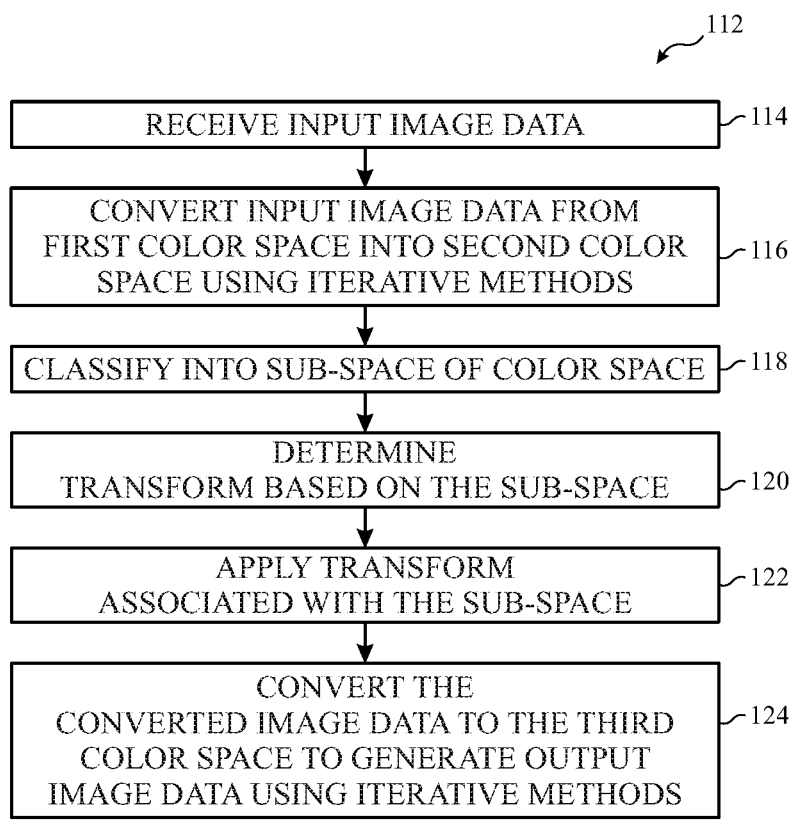
FIG. 8 is a flow diagram of a process for processing input image data received at a gamut mapping block of FIG. 7, in accordance with an embodiment.

An example of a process 112 for processing the input image data 90 received at the gamut mapping block 72 is described in FIG. 8. The process 112 may be facilitated (e.g., controlled, implemented) by instructions stored in a tangible, non-transitory, computer-readable medium, such as external memory 40 or other memory, using a controller of the processor core complex 18, such as a display pipeline controller of the display pipeline 38. For ease of description, the process 112 is described as performed by the gamut mapping block 72 (e.g., control circuitry of the gamut mapping block 72). It is noted that the operations of the process 112 are shown in a particular order; however, some of the operations may be performed in a different order than what is presented.

At block 114, the gamut mapping block 72 may receive input image data 90. The input image data 90 may be received from the processing block 70 and/or from the DMA block 64. The input image data 90 may include data in a RGB-based color space, such as a Standard Red Green Blue (sRGB) color space.

At block 116, the gamut mapping block 72 may convert input image data 90 from a first color space (e.g., RGB color space) to a second color space (e.g., hybrid color space, YCbCr color space) using iterative processes. When converting the input image data 90 from the first color space into a YCbCr color space, the three component values for the YCbCr color space may be created from the original RGB (red, green and blue) color space. The weighted values of R, G and B may be added together to produce a single Y value, representing the overall brightness, or luminance, of that region. The Cb value is then created by subtracting the Y from the blue value of the original RGB color space, and then scaling. The Cr value by subtracting the Y from the red value, and then scaling by a different factor. Although the processing of the gamut mapping block 72 is described as perform in the YCbCr color space, the gamut mapping block 72 may instead process the images in the RGB color space, in a YCbCg (or YCrCg) color space, or any other suitable color space.

Indeed, at block 116, the gamut mapping block 72 may also convert input image data into the hybrid color space (e.g., second color space) or a similar color space using a division operation. The division operation may use iterative processes, such as Newton-Raphson analysis, other suitable analysis and/or root approximation operations, an iteration-based computation, or the like, to predict roots used in a formula applied to determine the divisions of input image data into sub-spaces of the output color space (e.g., output color gamut).

At block 118, the gamut mapping block 72 may classify the input image data into sub-spaces of the third color space. Indeed, a search may be performed to determine which sub-space of the color space of the display device 12 the input image data 90 resides within (e.g., to identify a sub-space of the third color space). The gamut mapping block 72 may determine which sub-space of the third color space that the input image data formatted in the color gamut of the first color space resides within (e.g., within threshold values of) by considering ranges of values corresponding to the sub-spaces. The search may involve a binary tree-based search that performs iterative matches over different depths of a binary tree to determine which sub-space the input image data 90 corresponds. A first sub-space of the third color space may correspond to a first range of color values and a second sub-space of the third color space may correspond to a different, second range of color values (e.g., non-overlapping with the first range of color values). Consideration of these ranges may help identify to which sub-space to associate the particular color value being classified of the input image data 90. The transform may be determined to compensate for differences between the first color space and the third color space, (e.g., the color space used by electronic display 12) based on the sub-space classifications of the input image data 90. Indeed, each sub-space may correspond to a particular transform defined for the particular sub-space. When the transform is applied, the converted image data may undergo value adjustments to change a color and/or gray level used for respective portions of image data. It is noted that in some cases the search to place one or more values of the input image data 90 to one or more sub-spaces of the color space may be performed using software and provided to the gamut mapping block 72.

At block 120, the gamut mapping block 72 may determine the transform based on the sub-space determined at block 118. The gamut mapping block 72 may have configurations of color transforms defined differently in different sub-spaces of the input color space, by dividing the entire input color space into sub-regions, which are also referred to as sub-spaces.

At block 122, the gamut mapping block 72 may apply the transform determined at block 120 to the input image data 90. The transform applied is associated with the sub-space determined to correspond to the input image data 90. Each respective sub-region may have a custom adjustment applied to its particular values that overall results in the implementation of the desired transform to the converted image data to conform to the color space of the display 12. Applying the transform may involve using affine transformations that use a transformation matrix and offsets. These computations may benefit from the sub-regional-based analysis described herein.

The adjusted dataset may then be converted, at block 124, by the gamut mapping block 72 from the second color space to the third color space to generate the output image data 92 using iterative processes (e.g., inverse of previously applied iterative processes at block 116). The gamut mapping block 72 may output the output image data 92 to the processing block 70 for further processing and/or the output buffer 68 to be used to present an image frame on a display. It is noted that color spaces may be based on RGB color values and still be different color spaces, such as based on how differences between how particular pixels of the respective devices and/or respective color spaces are able to emit light. For example, the first color space and the third color space may both be based on RGB color values that render and/or are used to generate control signals to drive image presentation on the electronic display 12 in different manners, and thus warrant gamut mapping to adjust for the differences in color spaces. Indeed, one color space may be suitable for expected human vision and another color space may be suitable for unexpected or atypical human vision (e.g., more suitable for viewing by a user with color blindness or vision impairments).

Figure 9:
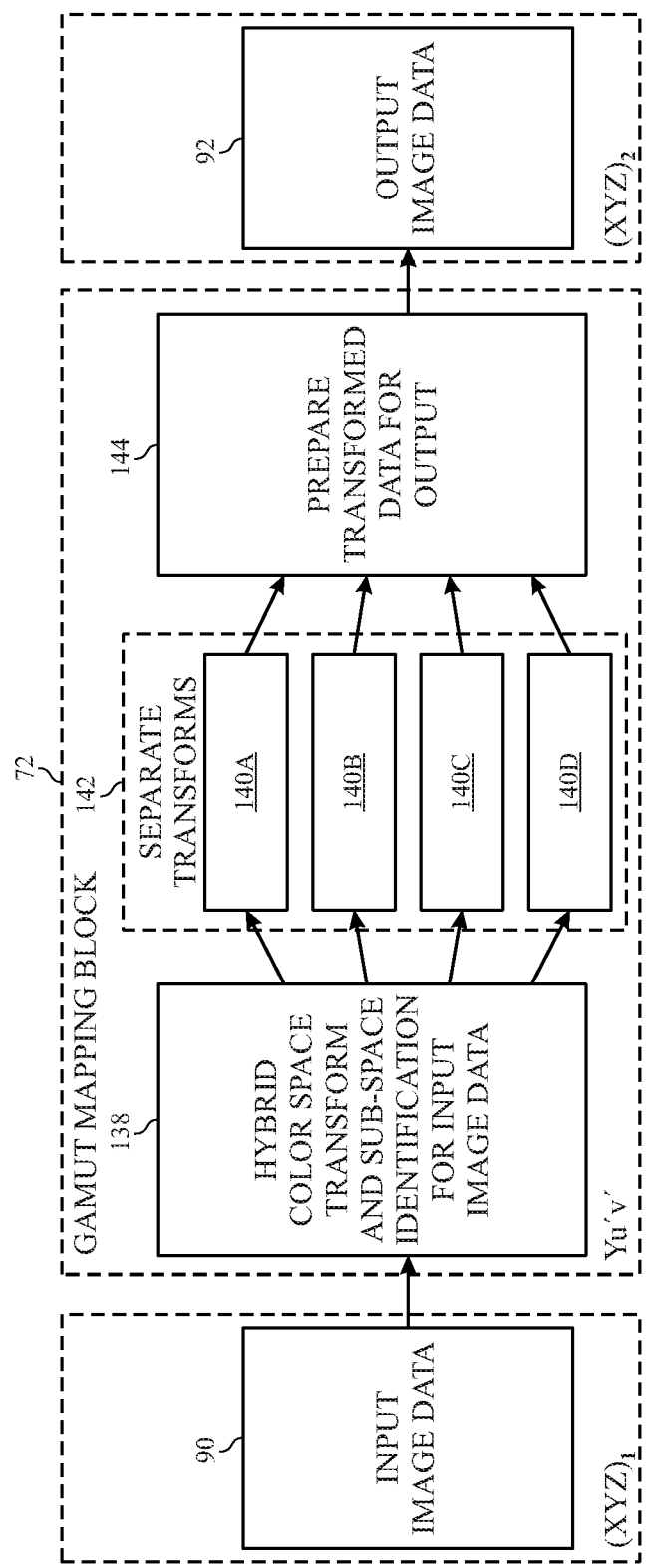
FIG. 9 is a diagrammatic representation of operations performed by the gamut mapping block of FIG. 7, in accordance with an embodiment.

FIG. 9 is a diagrammatic representation of operations performed by the gamut mapping block 72 in a hybrid color space domain (e.g., using values corresponding to a hybrid color space, or intermediary color space used for at least some forms of processing prior to presentation of the image data) to map a first color space to a second color space (e.g., first color space to hybrid color space to second color space). It should be understood that the processes represented by the diagram in FIG. 9 are simplified representations of the processing that is performed by software and/or hardware components of the gamut mapping block 72 (and/or of a display pipeline controller operating the components of the gamut mapping block 72 via generation of control signals and/or commands), and that more or fewer operations may be performed on the input image data 90.

As depicted, the input image data 90 is received by the gamut mapping block 72 and processed at block 138 to generate hybrid color space data associated with respective sub-spaces of the output color space (e.g., second color space). As described above, the input image data 90 is compared to sub-spaces of the output color space to determine which transform to apply at block 142. The input image data 90 may correspond to image data generated according to the first color space. The gamut mapping block 72 may use a hybrid color space to process the input image data 90, and thus may convert the input image data 90 from the first color space to the hybrid color space to perform mapping operations (e.g., translation operations). Indeed, the input image data 90 may be adjusted and/or used to generate intermediary image data of the hybrid color space. In some cases, as a part of the first operation at portion 138 (e.g., performed at a first time), the gamut mapping block 72 may determine regions 140 of the intermediary image data to organize the data for the transform. Each region 140 may correspond to a respectively applied transform, such as a transform for a particular color space that the image data associated with the region 140 corresponds. Transforms applied to respective regions may be same (and thus may be a same transform processed in parallel) and/or may be different. Each transform may be determined prior to starting the transform and/or may be applied as determined in a pipeline-format.

The regions 140 may be determined as equidistant and/or equal-sized portions, such as by dividing a height and/or width of the total dataset by four, or some other value (e.g., 2, 3, 5, . . . , N), and/or tetrahedrons, triangle prisms, or other three-dimensional (3D) space geometry primitives. Here, there are four regions 140A, 140B, 140C, and 140D represented, but any suitable number of regions may be used. In some cases, the gamut mapping block 72 may perform an initial analysis to determine which subsets of the intermediary image data have similar regional properties, such as brightness levels, saturation values, hue values, color distributions, or the like. The regions 140 may include non-equal portions (e.g., regions of varying dimensions or sizes) and/or may be based on regional properties of the input image data 90, and may be selected to decrease an average amount of variance of a target parameter over the resulting subset of image data. This may involve the gamut mapping block 72 comparing a difference between a determined average hue value and a determine maximum (or minimum) average hue value to a threshold amount of difference to determine if the difference is less than (or greater than and/or equal to) to the threshold amount of difference (e.g., 5% difference in value, 1% difference in value), and thus is suitable. A similar analysis may be used for other color parameters, such as brightness values, RGB color values corresponding to one or more pixels, saturation, luminance, or the like, and/or based on a histogram of the image data. It should be understood that these are merely example of suitable variations to determining the regions, and that different and/or many other factors may be considered when defining the regions.

Computations performed at block 142 may be separate computations performed independent of each other, such that data generated and/or analysis performed on the region 140A is independent of the same operations performed on the region 140B. These computations of portion 142 may be performed in serial or in parallel. Performing these computations in parallel may reduce the time spent transforming the image data. Furthermore, the computations performed at the portion 142 may also be improved (e.g., performed using operations that consume less resources) since some of the computations may converge and/or execute relatively faster over a smaller dataset than when performed over a larger dataset. For example, color gamut mapping operations associated with the computations performed at the portion 142 may include performing interpolation computations and/or linear transformations that may be relatively resource intensive (e.g., when compared to other processing operations), and thus may benefit from relatively reduced datasets. Indeed, some computations performed may include the gamut mapping block 72 determining roots by iteratively applying computations, such as a Newton-Raphson analysis and/or other root determination computation, to data of the regions 140. The regions 140 may represent relatively smaller sets of data that, in some cases, are characterized by relatively less variance than the entire set of data received as the input image data 90. Computations performed by the gamut mapping block 72 may converge faster when performed over smaller sets of the input image data 90 than when performed over the entire set, thereby improving computing operations.

Divisions used by the gamut mapping block 72 to generate the regions 140 may be logical divisions. In this way, the total dataset may remain intact during the transform operations of portion 142). For example, during the sub-region division operations of portion 138, the gamut mapping block 72 may determine and define processing ranges for the data, such that any computations may be performed over subsets of data corresponding to the processing ranges of the regions 140.

Once computations conclude and/or the gamut mapping block 72 has suitably transformed the input image data 90 to be compatible with a color space used by the electronic display 12 (e.g., third color space), the gamut mapping block 72 may join the divided regions 140 by rejoining the regions 140 of transformed image data (e.g., transformed sub-region of image data) or by removing logical divisions when processing (e.g., operations of portion 144) to generate transformed intermediary image data. The gamut mapping block 72 may convert the transformed intermediary image data into the output image data 92 in a color space used by the electronic display 12 (e.g., third color space). Referring back to FIG. 6, after any remaining processing is performed to the output image data 92, the display pipeline 38 may output the image data to the output buffer 68 for use by the display driver 42 in presenting an image frame. It is noted that transformations to the second color space may be applied to the image data processed as intermediary image data. Once the input image data 90 is converted to the hybrid color space, the input image data 90 may be referred to as "intermediary image data." A reverse of the conversion applied to the input image data 90 may transform the intermediary image data to generate the output image data 92. Processing and/or adjustments made to the intermediary image data while in the hybrid color space may compensate for differences between the first color space and the second color space.

FIG. 10 is a diagrammatic representation of operations performed by the gamut mapping block 72 to divide a first color space into sub-spaces. For example, the first color space may be defined based at least in part on data represented by cube 166. The gamut mapping block 72 may use the sub-spaces when determining a color mapping relationship for a respective region, such as to determine a color mapping relationship to be used to transform image data corresponding to the region of the cube 166 to data compatible with a hybrid color space.

Indeed, the gamut mapping block 72 may generate color mapping relationships 168 by dividing data indicative of the first color space (e.g., a source gamut) into sub-spaces 170 (e.g., sub-regions). The gamut mapping block 72 may apply a respective linear transformation on each sub-space 170, such as to determine a transform (e.g., the color mapping relationships 168). By applying the generated color mapping relationships 168, data for a respective pixel may be converted from a first color space to data for the respective pixel of a second color space representation. For example, the data may be converted directly from the first color space (e.g., RGB color space) to the hybrid color space, from the hybrid color space to the second color space (e.g., RGB color space), and/or from the first color space (e.g., RGB color space) to the second color space (e.g., RGB color space) using the transforms represented by the color mapping relationships 168.

For example, the gamut mapping block 72 may divide a color space into multiple sub-spaces 170, such as sub-space 170A, sub-space 170B, and so on. Although eight sub-spaces 170 are shown, any suitable number of sub-spaces may be used to divide data characterizing a color space, such as the first color space. The gamut mapping block 72 may determine a color mapping relationship 168 for a respective sub-space 170 of the first color space independent of a determination of a color mapping relationship 168 for the other sub-spaces 170 of the first color space. For example, the color mapping relationship 168A may correspond to the sub-space 170B. The first color space may be represented as the cube 166 (e.g., one axis 172 for R values, one axis 174 for G values, one axis 176 for B values) divided into eight sub-spaces 170. In this way, the cube 166 may be defined from 0 to 255 for each axis. When the gamut mapping block 72 divides the cube 166 into eight sub-spaces 170, each sub-space 170 corresponding to a subset of potential value combinations (e.g., one sub-space 170A corresponding to 0 to 127 for R values and another sub-space 170B corresponding to 127-255 for R values) that image data may represent as a particular combination of a R value, a G value, and a B value of the first color space, and thus corresponding to a data point plotted within the cube 166.

As described above, the combination of RGB values may map differently in the first color space when compared to a second color space. Thus, the gamut mapping block 72 may generate a color mapping relationship for the first color space to transform the image data from the first color space to the second color space. However, generating of the color mapping relationship may be improved when generating the color mapping relationships 168 for each of the eight sub-spaces 170 as opposed to generating a color mapping relationship for the first color space as a whole. As one may appreciate, it is generally more efficient to generate a linear and/or non-linear relationship for a smaller set of data and/or for data with less outliers (or variance) than for a dataset that is larger and/or with more outliers. Thus, generation of the color mapping relationship may improve since less computing resources may be used when the gamut mapping block 72 generates the color mapping relationships 168 for each of the eight sub-spaces 170 separately and/or in parallel. The gamut mapping block 72 generating the color mapping relationships 168 for each of the eight sub-spaces 170 may improve on mapping operations since equation roots of the color mapping relationship (e.g., slopes and/or characteristics) may be faster to converge, and thus less resource intensive, when determined for each of the eight sub-spaces 170 relative to performing a color mapping relationship determination for the entire cube 166 (e.g., entire color space).

It is noted that the gamut mapping block 72 may transform the first color space to the second color space before applying the color mapping relationships 168. The processes may be combined to permit applying of a respective transform of many determined transforms (e.g., color mapping relationships 168) to a respective region of the sub-spaces 170. Referring back to block 118 of FIG. 8, determination of the transform may involve the gamut mapping block 72 identifying the particular region of the sub-spaces 170 that corresponds to one or more regions 140 of the input image data 90. Indeed, the gamut mapping block 72 may classify the input image data 90 into one or more sub-spaces 170, and each sub-space 170 may have a respective transform to be applied to map between the two color spaces. This may permit the gamut mapping block 72 to transform portions of the input image data 90 according to a respective color mapping relationship defined for the color space.

To apply the color mapping relationships 168 to the input image data 90, the gamut mapping block 72 may transform the input image data 90 from the first color space to the second color space (e.g., hybrid color space). The gamut mapping block 72 may then apply a corresponding of the color mapping relationships 168 to the transformed image data. Application of the corresponding color mapping relationship 168 may transform the image data from the second color space to the third color space (e.g., display device color space). In this way, both determining of the color mapping relationships 168 and transformation of the input image data 90 for a present image frame (or future image frame) may be performed at least in part by using regional divisions of the dataset.

The gamut mapping block 72 may apply color mapping relationships 168 to transform the input image data 90 from the first color space to the third color space without first transforming image data from the first color space to the second color space, such as may occur in a bypass mode. The bypass mode may be a mode set by a controller of the display pipeline 38 (e.g., by setting a flag in a register, by transmitting a command to the gamut mapping block 72) when it is desired to process image data faster, such as to process the image data before a target presentation time and/or other timing considerations. The bypass mode may use color mapping relationships 168 that permit such a bypass, such as color mapping relationships 168 that are used to convert the input image data 90 to the output image data 92 without the hybrid color space. A flag stored in a register or otherwise received by the gamut mapping block 72 may indicate the bypass mode. When the gamut mapping block 72 determines that the flag has a first state corresponding to a bypass mode being activated, the gamut mapping block 72 may apply one or more transforms (e.g., apply any associated color mapping relationships 168) to the input image data 90 in the first color space to generate the output image data 92 of the third color space without first transforming the input image data 90 to a third color space (e.g., without first generating the intermediary image data).

The gamut mapping process (e.g., color space conversion process) described herein involves converting image data from a first color space to a third color space to provide a perceivably uniform appearance of the image data when presented in both the first color space and the third color space. The gamut mapping process may also be performed to correct for differences in color spaces used by different components of a same device, such as different components of the electronic device 10, and/or to correct for differences in a color space of the electronic device 10 over time. For example, color spaces may change over time due to changes in operating conditions and/or aging of one or more components of the electronic device 10. Furthermore, in some cases, color spaces may change between an image source, such as the application processor 52, and a display device 12. In some cases, one electronic device 10 may have multiple electronic displays 12, where one or more of the multiple electronic displays 12 may use a different color space from the color space used by the image source.

In some embodiments, the sub-spaces 170 of the color space (e.g., represented by the cube 166) may be divided into any suitable shape, such as triangular prisms, tetrahedrons, or the like. Furthermore, the gamut mapping block 72 may use any suitable process, such as hyperplane equations and/or a series of if-then statements in an instruction set stored in memory and executable by the gamut mapping block 72 and/or a controller of the display pipeline 38, to divide (e.g., logically divide) the color space in the sub-spaces 170. The same may apply to dividing the image data into regions. Indeed, in some cases, the regions may not be contiguous, and two unconnected or non-adjacent (e.g., logically unconnected, logically non-adjacent) portions of the cube 166 and/or image data, may be divided in a same region.

It is noted that these systems and methods described herein may be used to provide displays 12 accessible by users with abnormal human color vision, or color vision deficiencies (CVD). For example, using the methods to convert the image data from a first color gamut to a second color gamut may permit the conversion of image data from a color gamut associated with an image source for normal, typical or otherwise expected human vision to image data to be used to drive a display device with a color gamut to enable operations with abnormal or otherwise atypical human color vision, or color vision deficiencies (CVD) to have a similar or otherwise suitable viewing experience. These transformations that use defined sub-region methods may improve the readability of color information on display devices for users with CVD, as well as perceived image quality of these users, by modifying the colors desired to be adjusted without having to adjust each color or each portion of the image data. Indeed, these methods may be applied in lieu of a global adjustment, permitting more selective adjustments between color spaces.

Thus, the technical effects of the present disclosure include a gamut mapping block to perform color space conversion operations to improve image presentation on a display. The gamut mapping block may reduce computing resources (e.g., processing resources, time) consumed when performing color space conversion operations by dividing datasets to reduce an amount of data being used to transform image data between color spaces and/or determine a color mapping relationship. For example, the gamut mapping block may reduce a size of a color space of which color mapping relationships are determined by dividing a color space in to sub-spaces for use when determining respective color mapping relationships, as opposed to one color mapping relationship for the color space. Dividing the size of the dataset may reduce an amount of computing resources consumed since these computations, such as root determinations, may be relatively complex determinations that benefit, both in processing time and processing accuracy, from simplified datasets.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
an electronic display comprising a plurality of display pixels configured to present an image based on image data; and
a display pipeline comprising image processing circuitry coupled to the electronic display, wherein the display pipeline is configured to:
receive first image data from an image source, wherein the first image data corresponds to a first color space;
determine that a second color space used by the electronic display is associated with a first sub-space and a second sub-space of a third color space, wherein the first sub-space corresponds to a first range of three color component data values of the third color space, and wherein the second sub-space corresponds to a second range of three color component data values of the third color space distinct from the first range of three color component data values;
determine that a three color component data value of the first image data corresponds to the first sub-space based at least in part on the three color component data value of the first image data corresponding to the first range of three color component data values;
select a color mapping relationship associated with the first sub-space from a plurality of color mapping relationships associated with different respective sub-spaces of the third color space based at least in part on determining that the three color component data value corresponds to the first sub-space, wherein the color mapping relationship defines a transform to use to generate intermediary image data in the third color space from at least the three color component data value;
apply the color mapping relationship to the three color component data value of the first image data to generate intermediary image data;

convert the intermediary image data from the third color space to the second color space; and transmit the converted intermediary image data to the electronic display configured to emit light according to the converted intermediary image data.

2. The electronic device of claim 1, wherein the electronic display comprises a liquid crystal display, a light-emitting diode display, an organic light-emitting diode display, or a digital micromirror device display, or any combination thereof.

3. The electronic device of claim 1, wherein the display pipeline is configured to, when determining the color mapping relationship:
divide the first color space to generate a plurality of sub-regions, wherein the plurality of sub-regions comprise non-equal portions of the first color space based on regional properties of input image data;
perform iteration-based computations on the sub-regions of the plurality of sub-regions to generate a plurality of results; and
determine the plurality of color mapping relationships based at least in part on the plurality of results.

4. The electronic device of claim 1, wherein the display pipeline is configured to, when determining the color mapping relationship:
divide the first color space to define a plurality of sub-regions of three color component data values to be classified into respective sub-spaces of the second color space;
for a respective sub-region of three color component data values, compare data of the respective sub-region of three color component data values to different respective ranges of three color component data values of the different respective sub-spaces of the third color space using iterative methods to determine that the respective sub-region of three color component data values corresponds to the first sub-space;
apply the transform of the color mapping relationship defined for the first sub-space to the respective sub-region to generate a transformed sub-region; and
generate second image data based at least in part on a plurality of transformed sub-regions.

5. The electronic device of claim 4, wherein applying of the transform is started at a same start time for each sub-region.

6. The electronic device of claim 1, wherein the first color space comprises a first red-green-blue color space and the second color space comprises a second red-green-blue color space different from the first red-green-blue color space corresponding to a color space suitable for viewing by a user having a color vision deficiency (CVD).

7. The electronic device of claim 1, wherein the display pipeline is configured to:
generate the intermediary image data at least in part by:
dividing the third color space to generate the sub-spaces;
classifying the first image data with iterative methods to determine which of the respective sub-spaces of the sub-spaces that each respective three color component data value of the first image data is in, wherein each of the sub-spaces corresponds to a respective color mapping relationship for the third color space;
after classifying each three color component data value of the first image data into one or more sub-spaces, generating the intermediary image data at least in part by applying the transform of the respective color mapping relationship to each respective three color component data value of the first image data based at least in part on which respective sub-space of the one or more sub-spaces that the respective three color component data value was classified; and
generating second image data based on converting the intermediary image data to the second color space, wherein the second image data is transmitted as the converted intermediary image data to the electronic display.

8. The electronic device of claim 7, wherein the third color space comprises a hybrid color space, a luminance-first component-second component (YCbCr) color space, a uniform color space associated with axes corresponding to luminance, chroma, or hue, or any combination thereof.

9. The electronic device of claim 1, wherein the display pipeline is configured to:
divide the first image data to generate a plurality of sub-regions of data; and
determine the plurality of color mapping relationships based on respective alignment of the plurality of sub-regions with sub-spaces of the second color space, wherein the plurality of color mapping relationships comprises the color mapping relationship.

10. The electronic device of claim 9, wherein applying the color mapping relationship to the first image data involves classifying a plurality of sub-regions of the first image data into one or more sub-spaces of the second color space.

11. A method, comprising:
receiving first image data from an image source in image processing circuitry, wherein the first image data corresponds to a first color space;
determining that a subset of three color component values of the first image data correspond to a first sub-space of a second color space based at least in part on the subset of three color component values corresponding to a first range of three color component values corresponding to the first sub-space;
selecting a transform associated with the first sub-space from a plurality of transforms associated with different respective sub-spaces of the second color space based at least in part on determining that the subset of three color component values of the first image data correspond to the first range of three color component values of the first sub-space;
applying the transform to the subset of three color component values of the first image data to generate intermediary image data in the second color space;
converting the intermediary image data from the first color space to a third color space used by an electronic display; and
transmitting the converted intermediary image data to the electronic display to drive light emission according to the converted intermediary image data.

12. The method of claim 11, wherein applying the transform comprises converting the first image data from the first color space to the second color space before applying the transform to the subset of the three color component values of the first image data.

13. The method of claim 12, wherein:
generating the intermediary image data comprises:
converting each three color component value of the first image data from the first color space to the second color space; and applying the transform to the first image data to generate intermediary image data used to convert the first image data from the first color space to the third color space comprises:
dividing the first color space to generate a second plurality of sub-spaces; and
performing an iteration-based computation on each sub-space of the second plurality of sub-spaces to identify that the first image data corresponds to the first sub-space.

14. The method of claim 11, comprising applying the transform to the first image data after converting the first image data to a luminance-first component-second component (YCbCr) representation corresponding to the second color space.

15. A non-transitory, computer-readable medium comprising instructions that, when executed by a processor, cause the processor to perform operations comprising:
receiving input image data corresponding to a first color space;
determining that a three color component value of the input image data corresponds to a first sub-space of a second color space based at least in part on the three color component value of the input image data corresponding to a range of three color component values defined as corresponding to the first sub-space;
determining a transform to apply from a plurality of transforms associated with different respective sub-spaces of the second color space based at least in part on determining that the three color component value of the input image data corresponds to the first sub-space;
applying the transform to the three color component value of the input image data to generate intermediary image data in the second color space; and
converting the intermediary image data from the second color space to a third color space used by a display to generate output image data used by the display to present an image frame corresponding to the input image data.

16. The non-transitory, computer-readable medium of claim 15, wherein the operations for generating the output image data comprise generating converted image data at least in part by converting the input image data from the first color space to the second color space using iterative methods.

17. The non-transitory, computer-readable medium of claim 15, comprising instructions that, when executed by the processor, cause the processor to perform operations comprising:
generating a plurality of sub-regions from the input image data at least in part by:
converting the input image data to a luminance-first component-second component (YCbCr) representation corresponding to the second color space.

18. The non-transitory, computer-readable medium of claim 17, wherein the output image data comprises image data having equal hue, luminance, color values, or a combination thereof, relative to the input image data, and wherein the plurality of transforms are configured to process out-of-gamut colors.

19. The non-transitory, computer-readable medium of claim 15, wherein the operations of determining the transform to apply to the input image data involve usage of a binary tree.

20. The non-transitory, computer-readable medium of claim 15, the operations comprising:
reading a flag from a register of a display pipeline, wherein the flag has a first state; and
in response to reading the flag having the first state, determining to apply the transform to the input image data in the first color space without first transforming the input image data to the second color space.

* * * * *